United States Patent [19]

Wieg

[11] 3,749,501
[45] July 31, 1973

[54] MEASURING MACHINE
[75] Inventor: Heinrich J. Wieg, Burlington, Ohio
[73] Assignee: The Bendix Corporation, Southfield, Mich.
[22] Filed: Oct. 1, 1971
[21] Appl. No.: 185,650

[52] U.S. Cl. ............................. 356/169, 250/237 G
[51] Int. Cl. ........................................... G01b 11/04
[58] Field of Search ........................... 356/169, 170; 33/1 M, 125 A, 125 C; 250/237 G

[56] References Cited
UNITED STATES PATENTS
3,165,017  1/1965  Galabert ......................... 33/125 C
3,434,218  3/1969  Potter .............................. 33/125 C OTHER PUBLICATIONS
Measurement Made Easy, Metalworking Production 1/64, pp. 45–49.

Primary Examiner—Ronald L. Wibert
Attorney—Joseph V. Tassone et al.

[57] ABSTRACT

A dimensional measuring machine is provided and has a pair of parallel ways arranged on opposite sides of the machine and a pair of supports supported for reciprocating movements on the ways, with an elongated bridge construction extending substantially perpendicular and being carried by the supports. A gage head is provided and carried on a carrier which is supported for reciprocating movements along the bridge construction. The machine has means measuring the positions of the supports along the ways and providing electrical output signals and means measuring the position of the carrier along the bridge construction and providing another electrical output signal. The machine also has an electrical system for receiving and comparing the electrical signals and providing a signal representing the actual position of the carrier and gage head from a reference location.

3 Claims, 3 Drawing Figures 3,749,501

MEASURING MACHINE

BACKGROUND OF THE INVENTION

In dimensional measuring machines of the type which employ a bridge construction of extended length on the upper end portions of a pair of associated spaced vertical columns which are moved on an associated pair of correspondingly spaced horizontal ways, for example, a serious problem is presented in attempting to move such vertical columns with precision along the associated ways so that both columns move the same X-axis distance from a reference position. Further, this problem is not completely solved even by using expensive precision components. Accordingly, a corresponding problem is presented in attempting to establish the exact X-axis position of a gage head which is carried for Y-axis movement along the bridge construction.

SUMMARY

This invention provides an improved measuring machine which is of comparatively simple and economical construction and provides the exact position of a gage head carried on a beam of extended length supported at its opposite ends on a pair of associated supports even under conditions where such supports are moved different distances from a reference position along associated parallel ways.

Other details, uses, and advantages of this invention will be readily apparent from the exemplary embodiments thereof presented in the following specifications, claims, and drawing.

BRIEF DESCRIPTION OF THE DRAWING

The accompanying drawing shows a present preferred embodiment of this invention, in which.

DESCRIPTION OF ILLUSTRATED EMBODIMENT

Figure 1:
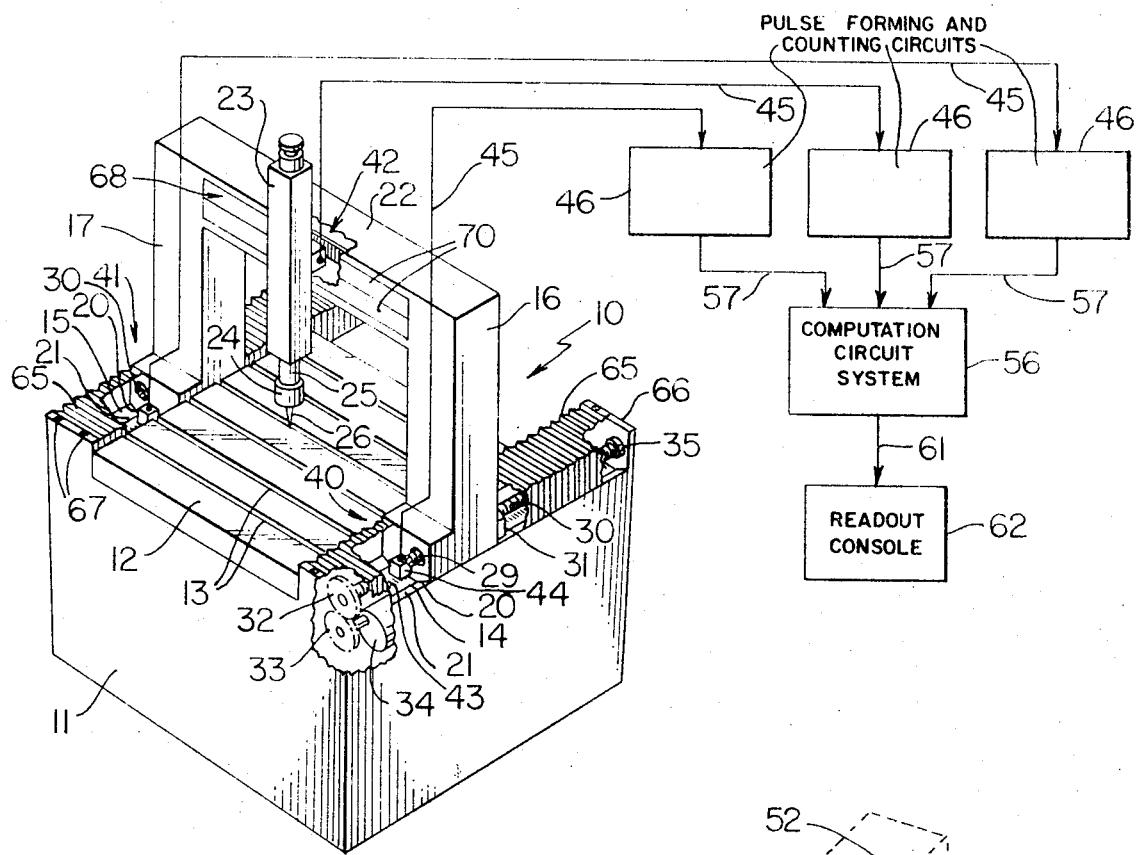
FIG. 1 is a perspective view with certain parts broken away and other parts shown schematically of one exemplary embodiment of this invention.

Reference is now made to FIG. 1 of the drawing which illustrates one exemplary embodiment of this invention in the form of a machine for obtaining dimensional measurements which is designated generally by the reference numeral 10. The machine 10 comprises a base 11 which has a worktable 12 supported thereon and such worktable has a plurality of conventional parallel T-slots 13 that are used in attaching a workpiece firmly in position on the worktable in accordance with standard practice.

The machine 10 has a pair of parallel horizontal ways 14 and 15 arranged on opposite sides thereof and a pair of supports or vertical columns 16 and 17 supported for reciprocating movements on the ways 14 and 15 respectively. Each column 16 and 17 has a lower end surface 20 which has a downwardly convex roughly U-shaped outside configuration and each surface 20 is nestably received within and supported on a cooperating trough-like U-shaped surface 21 comprising an associated way, either way 14 or 15 whereby the vertical columns 16 and 17 are supported for reciprocating rectilinear movements along their respective horizontal ways 14 and 15.

The machine 10 has a bridge construction 22 extending between and supported by the upper end portions of the vertical columns 16 and 17 and such bridge construction, which is often referred to as simply a gantry or bridge, extends substantially across the full width of the machine 10; and, the bridge 22 may be detachably fixed to the columns, if desired. The bridge 22 supports a carrier 23 for reciprocating rectilinear movements thereacross and the carrier 23 may be supported for substantially frictionless movement using conventional devices.

The carrier 23 carries a gage head 24 at the lower end of a vertically telescoping support shaft 25 which is slidably supported by the carrier 23 and the gage head 24 has a gaging probe 26 detachably fixed to its lower end. The gaging probe 26 is particularly adapted to engage a workpiece supported on the worktable 12 to determine the dimensional location and/or size of openings, contours, protrusions, etc., on such workpiece in accordance with known dimensional measuring practices.

The machine 10 has actuating means for moving the columns 16 and 17 along their respective horizontal ways 14 and 15. In this example, each column 16 and 17 is moved by an associated precision screw 30 which is threadedly received in an antifriction nut 31 (such as a nut using recirculating ball bearings) fixed to an associated column. The nut is fixed in axial alignment with a large diameter opening 29 in its column and the opening 29 assures the screw 30 does not contact such column during rotation of the screw.

The screw 30 has a gear 32 fixed to one end which is driven by a cooperating gear 33 fixed to the shaft of a reversible electric motor 34 supported on a frame carried by the base 11. The end of the precision screw 30 opposite the gear 32 is supported for substantially frictionless rotation in a suitable bearing 35 whereby the screw 30 may be easily rotated either clockwise or counterclockwise by the motor 34 and such rotation imparts linear movement in a known manner to the associated column due to the fact the nut 31 is fixed to such column.

However, it will be appreciated that even under conditions where the various components of the actuating means for the columns 16 and 17 are manufactured to precision tolerances and the motors 34 are precisely synchronized, the inherent character of the machine 10 with its columns 16-17 and the elongated bridge 22 is such that one of the vertical columns will move a distance in a horizontal plane which is different, either more or less, than the distance moved by the other column and each of such distances is often popularly referred to as an X-axis distance. Accordingly, the true or actual X-axis position of the gage head 24 and its probe 26 must be precisely determined.

The machine precisely determines the exact X-axis position of the gage head using a first measuring means or device 40 which determines the position of column 16 on way 14, a second measuring means or device 41 which determines the position of column 17 on way 15, and a third measuring means or device 42 which determines the position of the carrier 23 and, hence, gage head 24 along the bridge 22. Each measuring device 40, 41, and 42 comprises an electrooptical system which employs moire fringes for determining the relative positions of its relatively movable components. The measuring devices 40, 41, and 42 are used to precisely determine and indicate both the magnitude and direction of movement of the column 16 on way 14, column 17 on way 15, and carrier 23 along bridge 22 respectively. The devices 40-42 are substantially identical in construction and operation; therefore, the various substantially identical component portions will be given the same reference numerals and the detailed description which follows is fully applicable to all devices 40-42 and their components.

Figure 2:
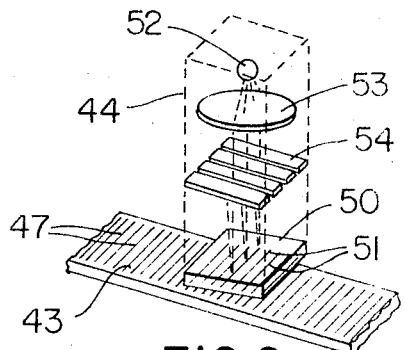
FIG. 2 is a perspective view with parts broken away and parts shown schematically illustrating a portion of a typical electro-optical system comprising the machine of FIG. 1.

Each device 40-42 comprises a reflective scale grating 43 which is fixed to its associated way or beam using any suitable technique known in the art, also see FIG. 2, and each of such devices also comprises a reading head 44 which operatively associates with the scale grating. The reading head 44 provides electrical signals through an associated electrical line 45 to an electrical circuit 46 which may include an up-down counter for counting electrical pulses from the reading head 44 and as will be described in more detail subsequently.

The scale grating 43 has a plurality of spaced parallel grating lines 47 provided on its top reflective surface and the reading head 44 has an index grating 50 provided with spaced parallel grating lines 51. The reading head is fixed to its associated structure so that its index grating is parallel to the top surface of the scale grating 43 and spaced therefrom only a few thousandths of an inch. The index grating 50 is constructed of a material, such as glass for example, so that the area or space between the grating lines 51 is clear or bright and is capable of transmitting light therethrough.

The index grating lines 51 cooperate with the scale grating lines 47 to produce an interference pattern and such pattern is referred to as a moire fringe pattern, or more popularly, a moire fringe. The manner in which a moire fringe pattern is defined is well known and the appearance and general arrangement thereof with respect to the cooperating grating lines producing such a pattern are also well known. Therefore, for simplicity, a detailed showing of such pattern will not be presented in the drawing; further, such a showing is not necessary for an understanding of this invention.

The reading head 44 has a light source 52 and collimating lens 53 which cooperate to direct light toward and through the index grating 50. The index grating 50 is supported in the reading head so that its grating lines 51 are slightly angularly displaced with respect to the grating lines 47 of the reflective scale grating 43 so that light passing through the index grating is reflected from the reflective scale grating and the cooperating action of the grating lines produces the previously mentioned moire fringe pattern. The reading head 44 also has a plurality of four photoelectric devices 54 which detect each fringe as it comes into view and each photoelectric device transmits a corresponding electrical signal through line 45 to its electrical circuit 46.

As each reading head 44 with its index grating 50 is carried by its component across its cooperating scale grating, a plurality of dark fringes are produced which, with continued movement of the scale grating, move across the field of view of the photoelectric devices 54. Each fringe extends completely across the scale grating 50 perpendicular to its grating lines 51 in a well known manner whereby it will be seen that the photoelectric devices 54 are arranged in a corresponding manner. The dark fringes are sensed by the photoelectric devices 54 and signals are fed through line 45 to the electrical system 46, as previously mentioned.

The detection of the direction of movement of each component such as column 14-15 or carrier 23 along its associated structure is achieved in a known manner merely by displacing the output of one of the photoelectric devices 54 comprising an associated reading head 44 ninety degrees from another of the photoelectric devices 54 in such reading head whereby one of the devices 54 provides an electrical output in the form of a sine wave while the other provides an output in the form of a cosine wave. This sine-cosine wave relationship enables the determination of the direction of movement of an index grating (and hence the component to which it is fixed) relative to its scale grating in a manner which is well known in the art. Further, the electrical components comprising the electrical circuit 46 cooperate with the photoelectric devices 54 and modify the electrical signals detected by such photoelectric devices 54 converting these signals into the usable pulses which are counted by a standard up-down counter comprising circuit 46 to determine both the extent or magnitude of movement as well as the direction of such movement. The circuit 46 employs known pulse-squaring circuits, shaping circuits, etc., to provide sharp well defined pulses capable of being counted in the up-down counter.

The machine 10 has an electrical computation system 56 which receives the signals from the devices 40, 41, and 42 through lines 57 from circuits 46 and provides an electrical output signal through a line 61 extending from system 56 and such signal represents the true or actual position of the carrier and gage head from a reference location. The operation of the system 56 will be described in detail subsequently.

Even with the best components available in industry, it is practically impossible to move vertical columns 16 and 17 the same exact X-axis distance along their respective ways 14 and 15 so that the corresponding X-axis position of the gage head is known at all times. X-axis position is the term used to define the distance from a reference location (such as a plane perpendicular to parallel ways 14 and 15) along the X-axis which in normal measuring practice is considered as being in a horizontal plane with the Y-axis being arranged in a horizontal plane perpendicular to the X-axis and the Z-axis being in a vertical plane.

Figure 3:
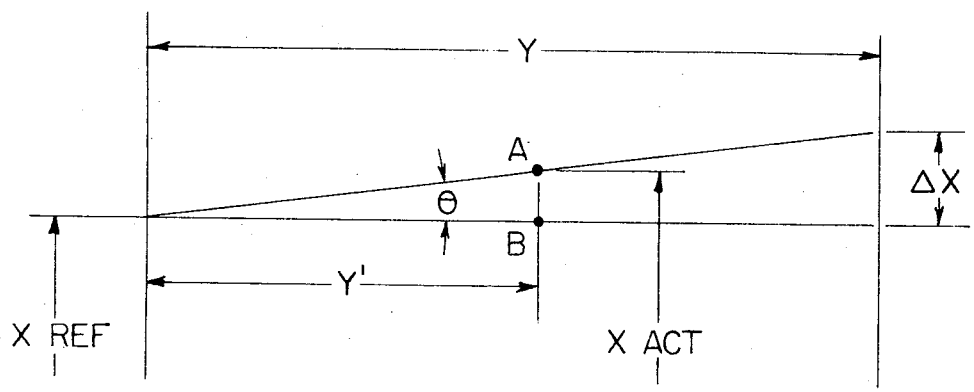
FIG. 3 is a diagram presenting the problem caused by differential movement of vertical columns comprising the machine of FIG. 1 along associated horizontal ways.

The problem is illustrated in FIG. 3 of the drawing wherein it is shown for the bridge 22 having a length Y and supported on columns 16 and 17, one of the columns such as column 17 is likely to be moved a reference distance designated X REF along its ways from an initial starting point. The other column 16 is likely to be moved by a distance represented by X REF plus the distance or increment $\Delta X$. Under these conditions, the actual distance X ACT of the gage head from the reference location or position is unknown and will depend on the position of the carrier 23 along the Y-axis or bridge 22.

Assume that the gage head 24 is at position Y' along the bridge 22, then it will be shown that $$X\ ACT = X\ REF \pm (Y'/Y \cdot \Delta X) \tag{1}$$

Considering the tangent of the illustrated angle $\theta$ $$\tan \theta = \Delta X/Y \tag{2}$$

or $$\tan \theta = AB/Y' \tag{3}$$

where AB is the distance that the gage head 24 in this example is displaced beyond the position X REF.

Solving for AB in equation 3 and substituting $\Delta X/Y$ for $\theta$ $$AB = Y'\Delta X/Y \tag{4}$$

Thus $$X \text{ ACT} = X \text{ REF} + Y'\Delta X/Y$$

Accordingly, it will be seen that in order to determine the exact X-axis position or X ACT of the gaging probe 24, it is necessary for the electrical system 46 to have suitable electrical components to provide an electrical solution to the above equation. This solution is readily obtained by providing electrical logic means, which are well known in the art, in the system 56. In particular, signals from the three circuits 46 are fed into the electrical computation system 56 through the electrical lines 57, which generates therefrom an output signal through a line 61 and such signal represents the true or exact X-axis position, X ACT, of the gage head 24 and its probe 26. This X-axis position is considered as being measured from a reference plane or line arranged perpendicular to the horizontal ways 14 and 15.

The signal through line 61 may be provided to suitable readout means such as a readout console 62 to indicate a dimensional measurement which may be displayed on a visual panel and/or provided as a permanent record on a suitable chart or card in accordance with standard practice.

The machine 10 has shields in the form of expandible and contractible accordian-like dirt and dust shields 65 which are fixed to opposite sides of each column 16 and 17 and to upwardly extending plate-like portions 66 comprising the base 11. The shields are made of any suitable elastomeric material and may be detachably held in position by metal screws 67, or the like. The shields 65 protect the components of the electro-optical system comprising each measuring device 40 and 41 against dirt, dust, extraneous light, etc. It will also be seen that the measuring device 42 employs a shield 68 which is used for the same purposes as shields 65. The shield 68 is comprised of a pair of elastomeric members 70 which are fastened along one side portion to the beam construction 22 and have edge portions which are unattached and overlapped. The members 70 are constructed and arranged so that the carrier 23 may be moved in a substantially unobstructed manner along the beam construction 22 while assuring the shield 68 provides its intended function.

In this disclosure of the invention, each vertical column of the machine 10 is shown as being moved by an independent screw driven by an electric motor and the driving electric motors are precisely synchronzied in accordance with standard practice. However, it will be appreciated that any other suitable technique may be employed for moving the columns 16 and 17 and such technique may comprise primarily a mechanical system with a single motor drive and suitable mechanical connections such as screws, gears, etc., driving the vertical columns 16 and 17 along their ways. Nevertheless, irrespective of the drive which is provided, the problem of positioning each support or column along its way in a precise manner would be similar to the problem described above and suitable means for determining the position of each gage head 24 would be provided in accordance with the teachings of this invention.

The vertical columns 16 and 17 are presented in this application as being supported on horizontal ways having a roughly U-shaped cross-sectional configuration; however, it will be appreciated that the ways may be provided in any suitable manner known in the art. Further, the columns may be supported using roller bearings, ball bearings, air bearings, or other antifriction means.

In this disclosure the invention is illustrated and described in connection with horizontal ways on the machine 10; however, it will be appreciated that the ways may be arranged vertically on an associated machine or at any desired angle to a horizontal plane whereupon the teachings of this invention in determining the exact position of the gage head or operating agency from a reference location would still be applicable.

In this disclosure a measuring machine has been illustrated and described and employs the concepts of this invention for determining the exact position from a reference location of an operating agency in the form of a gage head 24 having a gaging probe 26. However, it is to be understood that the teachings of this invention are fully applicable to all types of machines including machine tools having operating agencies of other types such as cutting tools, or the like. Further, the teachings are fully applicable to numerically controlled machines of all types.

In this disclosure means have not been shown or described for moving the carrier 23 along the bridge construction 22; however, it will be appreciated that any suitable means may be provided for this purpose, including either manually or by suitable automatic means.

It will also be appreciated that suitable electrical lines are provided for supplying power to the various components of the machine such as the electrical system, motors, circuits, measuring devices, etc.

While present exemplary embodiments of this invention, and methods of practicing the same, have been illustrated and described, it will be recognized that this invention may be otherwise variously embodied and practiced within the scope of the following claims.

What is claimed is:

1. A machine comprising, a first way arranged on one side thereof, a second way arranged on the opposite side thereof parallel to said first way, a first support supported for reciprocating movements along said first way, a second support supported for reciprocating movements along said second way, a bridge construction extending perpendicular to said ways and being supported by said supports, a carrier supported for rectilinear reciprocating movement along said bridge construction, first means measuring the position of said first support from a reference location and along said first way and generating corresponding electrical signals, second means measuring the position of said second support from said reference location and along said second way and generating corresponding electrical signals, third means measuring the position of said carrier along said bridge construction and generating corresponding electrical signals, and an electrical computation system receiving said electrical signals corresponding to the position of said first and second supports and said carrier and generating from said corresponding electrical signals a signal which represents the actual position of said carrier from said reference location.

2. A machine as set forth in claim 1 further includes a gage head having a gaging member carried by said carrier.

3. A machine as set forth in claim 1 and further comprising actuating means for moving said supports along said ways.

* * * * *